(12) United States Patent
Schlittenbauer et al.

(10) Patent No.: US 9,874,939 B2
(45) Date of Patent: Jan. 23, 2018

(54) USING A GESTURE TO EVALUATE DISPLAYED INFORMATION AND INITIATE AN OPERATION OF A VEHICLE SYSTEM

(71) Applicant: AUDI AG, Ingolstadt (DE)

(72) Inventors: Michael Schlittenbauer, Ingolstadt (DE); Martin Roehder, Ingolstadt (DE); Lorenz Bohrer, München (DE)

(73) Assignee: AUDI AG, Ingolstadt (DE)

( * ) Notice: Subject to any disclaimer, the term of this patent is extended or adjusted under 35 U.S.C. 154(b) by 185 days.

(21) Appl. No.: 15/125,084

(22) PCT Filed: Mar. 13, 2015

(86) PCT No.: PCT/EP2015/000568
§ 371 (c)(1),
(2) Date: Sep. 9, 2016

(87) PCT Pub. No.: WO2015/149914
PCT Pub. Date: Oct. 8, 2015

(65) Prior Publication Data
US 2017/0045949 A1    Feb. 16, 2017

(30) Foreign Application Priority Data

Mar. 31, 2014 (DE) .................. 10 2014 004 675

(51) Int. Cl.
*G06F 3/01* (2006.01)
*B60K 35/00* (2006.01)
(Continued)

(52) U.S. Cl.
CPC .............. *G06F 3/017* (2013.01); *B60K 35/00* (2013.01); *B60K 37/06* (2013.01); *B60W 50/10* (2013.01);
(Continued)

(58) Field of Classification Search
CPC ................. G06F 3/017; G06F 3/04883; B60K 2350/1052; B60W 50/10
See application file for complete search history.

(56) References Cited

U.S. PATENT DOCUMENTS

2003/0138130 A1    7/2003  Cohen et al.
2006/0167943 A1*   7/2006  Rosenberg .............. G06F 3/017
(Continued)

FOREIGN PATENT DOCUMENTS

DE    10 2010 036 666 A1    2/2011
DE    20 2012 005 255 U1    8/2012
(Continued)

OTHER PUBLICATIONS

German Office Action dated Jul. 3, 2015 from German Patent Application No. 10 2014 004 675.3, 5 pages.
(Continued)

*Primary Examiner* — Kent Chang
(74) *Attorney, Agent, or Firm* — Staas & Halsey LLP

(57) ABSTRACT

An optical system which is designed to detect a gesture, and a processing unit that is coupled to the optical system and is designed to analyze the detected gesture, are included in a gesture evaluation system. The gesture evaluation system furthermore has a utilization unit that is designed to save an evaluation that has been detected from the gesture together with evaluated information.

15 Claims, 1 Drawing Sheet

(51) Int. Cl.
*G06F 3/03* (2006.01)
*H04L 29/08* (2006.01)
*B60W 50/10* (2012.01)
*B60K 37/06* (2006.01)

(52) U.S. Cl.
CPC .... *G06F 3/0304* (2013.01); *B60K 2350/1016* (2013.01); *B60K 2350/1052* (2013.01); *B60K 2350/2013* (2013.01); *B60K 2350/2052* (2013.01); *B60K 2350/357* (2013.01); *H04L 67/12* (2013.01)

(56) References Cited

U.S. PATENT DOCUMENTS

| | | |
|---|---|---|
| 2008/0170749 A1 | 7/2008 | Albertson et al. |
| 2009/0174677 A1* | 7/2009 | Gehani ............... G06F 3/04847 345/173 |
| 2010/0185341 A1 | 7/2010 | Wilson et al. |
| 2011/0080490 A1 | 4/2011 | Clarkson et al. |
| 2011/0119639 A1* | 5/2011 | Tartz ..................... G06F 3/016 715/863 |
| 2011/0181526 A1* | 7/2011 | Shaffer ................. G06F 9/4443 345/173 |
| 2011/0289456 A1* | 11/2011 | Reville .................. G06F 3/017 715/830 |
| 2012/0105257 A1 | 5/2012 | Murillo et al. |
| 2013/0080371 A1 | 3/2013 | Harber et al. |
| 2013/0155237 A1 | 6/2013 | Paek et al. |
| 2013/0271360 A1* | 10/2013 | MacDougall ..... H04M 1/72519 345/156 |
| 2014/0055386 A1* | 2/2014 | Duheille ............... G06F 3/0488 345/173 |
| 2014/0354527 A1* | 12/2014 | Chen ...................... G06F 3/017 345/156 |
| 2014/0380247 A1* | 12/2014 | Tecarro ................. G06F 3/0483 715/863 |

FOREIGN PATENT DOCUMENTS

| | | |
|---|---|---|
| DE | 10 2013 201 746 A1 | 8/2013 |
| DE | 11 2011 104 733 T5 | 10/2013 |
| DE | 10 2014 004 675.3 | 3/2014 |
| EP | 1 830 244 A2 | 9/2007 |
| EP | 2 575 007 A1 | 4/2013 |
| WO | 2012/135153 A2 | 10/2012 |
| WO | 2013/037082 A1 | 3/2013 |
| WO | PCT/EP2015/000568 | 3/2015 |

OTHER PUBLICATIONS

International Search Report dated Jun. 15, 2015 from International Patent Application No. PCT/EP2015/000568, 6 pages.
English translation of the International Preliminary Report on Patentability dated Oct. 13, 2016 from International Patent Application No. PCT/EP2015/000568, 11 pages.

* cited by examiner

USING A GESTURE TO EVALUATE DISPLAYED INFORMATION AND INITIATE AN OPERATION OF A VEHICLE SYSTEM

CROSS REFERENCE TO RELATED APPLICATIONS

This application is a U.S. national stage of International Application No. PCT/EP2015/000568, filed on Mar. 13, 2015. The International Application claims the priority benefit of German Application No. 10 2014 004 675.3, filed on Mar. 31, 2014. Both the International Application and German Application are incorporated by reference herein in their entirety.

BACKGROUND

Described herein are a gesture evaluation system and a method for evaluating a gesture. In addition, described herein is a vehicle which includes the gesture evaluation system.

Recently, there is a tendency to use systems having optical sensors for detecting gestures in vehicles in order to operate devices that are installed in the vehicle. A distinction is made here between gestures for activating devices and gestures for operating devices. One example in this respect is described in German Patent Application DE 20 2012 005 255 U1. The latter proposes an operating apparatus for a vehicle having a gesture monitoring unit and an actuating unit for actuating an associated apparatus. The gesture monitoring unit is designed to capture non-tactile gestures made by a user. Furthermore, the operating apparatus is placed in an operating state if the gesture monitoring unit captures a non-tactile activation gesture, with the activation gesture differing from an actuation gesture.

Evaluating content is known from the field of social media. Here, online content such as an image or a status update is frequently evaluated by pressing a like button on a presentation surface. By pressing the like button, a user gives a positive evaluation of the online content with which he was presented, for example on a website. However, evaluations on the basis of gestures within a vehicle management system have so far been less common.

Until now, functions in the vehicle have been retrieved by actuating defined function buttons. In order to sense button actuations, one electrical or capacitive switch per button has been necessary. In local terms, functions are limited to the surface of the mechanical button. Until now, it has been possible for example to evaluate songs or tracks on multimedia playback devices, such as smart phones, so as to provide automated playlist configurations with evaluation criteria. However, no buttons having such functions have been incorporated in a vehicle, and the function has thus not been realized.

This has the disadvantage that vehicles have no criterion for automated playlist configurations, for example. The entire functionality of multimedia playback devices is not yet available in vehicles.

SUMMARY

Described herein is a vehicle having a gesture evaluation system which is able to give evaluations in the vehicle.

The gesture evaluation system may include an optical system which is designed to detect a gesture. The gesture evaluation system furthermore may include a processing unit that is coupled to the optical system and is designed to analyze the detected gesture. Additionally, the gesture evaluation system may include a utilization unit that is designed to save an evaluation that has been detected from the gesture together with evaluated information.

In the gesture evaluation system described herein, an evaluation gesture is used. In other words, a gesture that classifies an evaluation may be used (for example, a thumbs-up gesture may be classified as a positive evaluation). The evaluation can relate to various applications, for example a song, a location, a restaurant, an attraction or the like can be evaluated. This is possible since the evaluation gesture may be recorded using an installed camera, and this camera interacts with a further technical unit within the vehicle, for example the entertainment system, in particular the audio system or the navigation system. If a song title is presented, for example, an evaluation can be made during the playback without the need to actuate an operating button, merely by way of an evaluation gesture. This evaluation gesture is detected by the optical recording system in the vehicle and transmitted to a corresponding evaluation unit connected to the audio system, with the result that information that is initialized by the movement gesture is saved with the song title.

The gesture evaluation system thus ensures that an evaluation gesture made by a vehicle occupant is detected and the evaluation is saved together with the evaluated information. The processing unit detects the evaluation gesture, for example using a time-of-flight camera installed in the vehicle, and the utilization unit has a memory for storing the evaluated information. An evaluation is thus made in contactless fashion by the occupant of the vehicle providing an evaluation gesture. Various patterns can be stored in the gesture evaluation system such that different evaluation gestures can be detected.

Control gestures with which a technical device can be operated in contactless fashion are known from the related art. In the present case, the focus is not on the manner of operation, but the aim is a real evaluation, i.e. to communicate additional information to a system, which is why a distinction is made between an operating operation and an evaluation operation. An operating operation can additionally be carried out after the evaluation operation.

In an embodiment, provision may be made for the utilization unit to be part of a vehicle management system. It is possible in this way to provide information using a central unit and to store the information together with the evaluation after evaluation for later applications. For example, an audio system of the vehicle can be connected to the gesture evaluation system in order to store evaluated song titles. It is thus possible to store an evaluation individually for each person in the vehicle that can be retrieved as soon as the person is recognized by the vehicle management system. Provision may furthermore be made for the gesture evaluation system to be connectable to the Internet such that information can get from the Internet into the vehicle so as to be evaluated there and/or information is transmitted from the vehicle to the Internet so as to be saved and published there, for example on a Facebook page. The vehicle management system can furthermore be connected to a cloud system that saves information and makes it available upon retrieval.

In an exemplary embodiment, provision may be made for the detected gesture to be an upright thumb. For example, a right-hand thumb of a person may be detected using the gesture evaluation system. This gesture is defined as a positive evaluation, in particular as an "I like" gesture. If a piece of music is currently being played, it can be "liked."

Other information is likewise suitable for being "liked," i.e. for being evaluated positively.

In a further exemplary embodiment, provision may be made for the information to be information selected from a song, a location, a service facility, an image, a graphic, status information, a physical variable, a measurement value, a sound and a suggestion. Such information can be individualized by storing an evaluation together with the information for a user. The evaluation can be used at a later point in time, for example to play a preferred song or a preferred music genre on the audio system of the vehicle. The gesture evaluation system can furthermore be connected to a navigation device so that locations, restaurants, attractions or the like can be evaluated.

In a further exemplary embodiment, provision may be made for the information to be provided on a presentation apparatus of the vehicle. A presentation apparatus in this case can be an operating console in the vehicle. The presentation apparatus can also be a projection apparatus that makes the information available within the space, without a defined presentation apparatus being present. The presentation apparatus can also be a display that is installed in the vehicle and is part of the vehicle information system.

According to an advantageous provision, with the gesture evaluation system, a time period of a gesture is detectable and a further function of the gesture evaluation system is activatable in dependence on the time period of the gesture. A further function can be, for example, a ranking such that the information can be rated. To this end, it is possible for example to award a variable number of stars to permit differentiation among positively evaluated information. Initiating an operating operation that follows the evaluation can also be a further function of the gesture evaluation system. The operating operation can, for example, relate to an installed piece of equipment in the vehicle, such as the HVAC system or the audio system or entertainment system including videos. If the evaluation gesture is provided by a person for more than five seconds, for example, this could mean that further operation of a device is desired, for example selection of a menu item.

Also described herein is a method for evaluating information, wherein the information is provided by a device that is installed in a vehicle. The method includes providing information in a vehicle. The method furthermore includes detecting a gesture that relates to the provided information. The method furthermore includes analyzing the gesture in the form of an evaluation with respect to the provided information and saving the evaluation together with the provided information.

The method thus provides a way for contactless evaluation in a vehicle.

In an exemplary embodiment, provision may be made in the method for detecting a time period of an evaluation gesture and activating a further function in dependence on the time period. The further function can be, for example, operating an apparatus in or outside the vehicle. The further function can furthermore be activating a menu or giving a ranking, i.e. a detailed evaluation.

Provision can furthermore advantageously be made for the method to include passing on the evaluation together with the provided information to a location outside the vehicle via a radio link. The evaluation can in this way be transmitted to the Internet, for example.

Also described herein is a vehicle having the gesture evaluation system described herein. The vehicle can be a passenger car or a heavy goods vehicle. The vehicle can also be an electric vehicle, a hybrid vehicle or a known vehicle having an internal combustion engine.

It should be noted that the features described herein for an apparatus and for a method can apply correspondingly and be combined with one another in any desired fashion.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
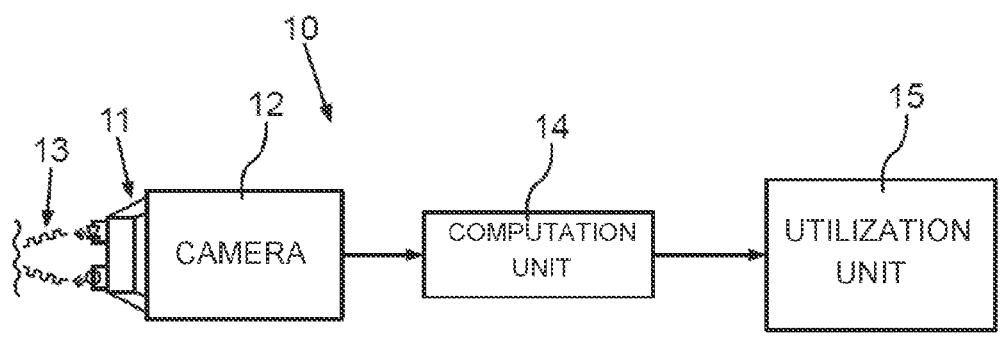
FIG. 1 is a diagram of a gesture evaluation system in a vehicle.

Reference will now be made in detail to the preferred embodiments, examples of which are illustrated in the accompanying drawings, wherein like reference numerals refer to like elements throughout.

Referring to the drawings, FIG. 1 shows an exemplary embodiment of a gesture evaluation system 10 that is installed in a vehicle (not illustrated). The gesture evaluation system 10 has an optical sensor 11 which measures the interior of the vehicle. In the present case, the optical sensor 11 may be a PMD sensor and part of a time-of-flight camera 12 (ToF camera). The optical sensor 11 can capture the geometry of the interior of the vehicle, including occupants and their movements. This can take place for example by way of reflection of emitted infrared radiation 13 from the ToF camera.

The gesture evaluation system 10 of FIG. 1 furthermore may include a computation unit 14 with which signals of the optical sensor 11 are analyzed. The computation unit 14 can be part of a control device in the vehicle, for example an ECU (electric control unit). The computation unit 14 may be operatively connected to a utilization unit 15, wherein the utilization unit 15 further processes and thus utilizes a gesture that was detected by the camera 12 and the computation unit 14. Utilization can be effected by way of providing the evaluation to a piece of equipment in the vehicle and storing it together with evaluated information in a data memory. If the evaluated information is retrieved at a later time, the evaluation that is saved in this respect can be provided in addition to the actual information.

For the purposes of evaluating a gesture, the optical sensor 11 measures the interior of the vehicle, including the occupants in the interior. The signals are evaluated in the processing unit, which is designed as the computation unit, and are made available to the vehicle management system for a response. Here, the extremities of a person can be extracted without problem, as a result of which the position of fingertips can be ascertained at any time. By tracking the trajectory with position and speed, gestures can be extrapolated. Triggering the function "like" or "I like," i.e. a raised thumb, takes place if possible only when the hand is kept steady.

Figure 2:
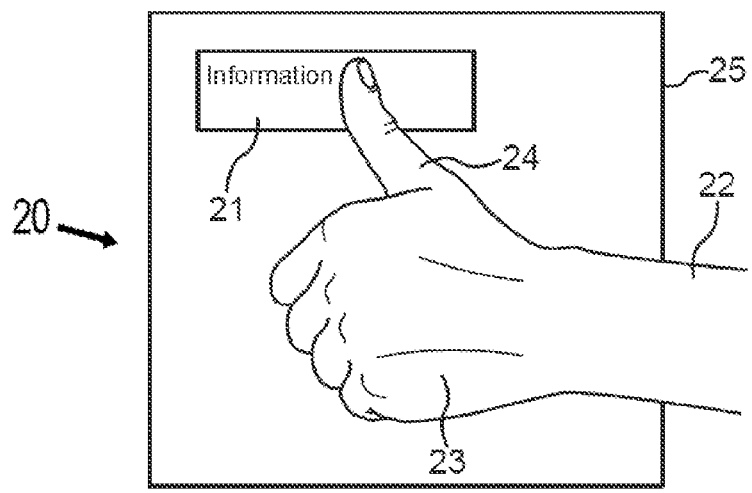
FIG. 2 is a diagram illustrating an exemplary gesture for evaluating information.

Referring to FIG. 2, illustrated is an exemplary gesture 20 for evaluating information 21 with the gesture evaluation system 10 of FIG. 1. The gesture evaluation system 10 may be located in a vehicle, in which a person evaluates provided information 21 by way of a gesture. The information is here represented on a presentation surface. The information can here be represented directly on a screen or display, or be projected into the space. In response to the provided information 21, the person in the vehicle gives an evaluation by way of the gesture 20. FIG. 2 shows an outstretched arm 22 of the person that provides a gesture 20 by way of a rolled first 23 and a thumb 24 that points upward. This gesture 20 can be detected by the gesture evaluation system 10, shown in FIG. 1, so as to be analyzed and finally for storing an evaluation with information that has been evaluated by way of the gesture 20.

Information 21 in the present exemplary embodiment is a piece of music that plays during the evaluation. The presented information 21 is, for example, a video for the piece of music or the title of the piece of music. The evaluation gesture 20 is preferably a thumb on a fist, with the thumb pointing upward, as shown in FIG. 2. That means that the optical system 11, 12 in the vehicle is designed such that it detects a hand with an upright thumb 24. This gesture 20 is stored as a positive evaluation and saved together with the evaluated piece of music. The evaluation information can be used at a later point in time, for example for selecting songs, such that only songs are played that have been stored with a positive evaluation, for example.

This produces a list of favorites with positively evaluated pieces of music. Such a list of favorites can furthermore be provided with further information, for example not only with a positive evaluation, but also a weighting, what is called a ranking. Stars or points can be awarded in this case, for example, with the number of stars or points corresponding to the level of the evaluation. This means that, for example, five stars or points yields the highest evaluation within a positive evaluation, whereas one star or one point yields the lowest evaluation within the positive evaluation. This rating using stars or points can be effected for example by activating, after detection of an evaluation gesture by the optical system 11, 12, a further input device, for example by way of the display 25, which prompts, in addition to the detected gesture, the giving of a detailed evaluation by way of stars or points. By way of example, an input device or operating panel in the central console of the vehicle which provides mechanical buttons or virtual buttons can be used so that the further evaluation can be input. Likewise possible is voice recognition, for example by saying a number, wherein this number is stored as the level of the evaluation, for example the number "four" for evaluating with four stars or points. Another option is to use the duration of a gesture to permit the evaluation to be weighted. In this case, the duration of a gesture can correspond to the weighting of the evaluation. That means that a thumb that is kept raised for a relatively long time period, for example 5 seconds, effects a higher evaluation than a thumb which is kept up for only two seconds.

A similar application of a gesture evaluation system in a vehicle can take place with a navigation system. In this case, locations, attractions, hotels, theaters and so on can be displayed along the way, which can be evaluated by way of the optical system in the vehicle by an evaluation gesture being detected and stored together with information from the navigation system. It is thus possible, for example, to easily find one's way back to a restaurant by storing favorites in the navigation system and selecting them for determining a destination.

The proposal is accordingly to detect physically accurate positioning of the occupant (for example using a time-of-flight camera), or of body parts of the occupant gestures or hand configurations. If, as shown in FIG. 2, the hand with an upright thumb is held in front of a presentation apparatus 25, in this case a display, the song or track that is playing can be evaluated or "liked." Evaluation can be effected for the audio system or the player, and the track can be listed as "I like" on the personalized Facebook timeline. A so-called "I like" gesture is detected.

The following advantages are thus attained: the user's experience is positively influenced, i.e. a "joy of use factor" arises for the user. No button in the vehicle is necessary for this evaluation. Savings in terms of costs of buttons and a positive design effect are the advantages here. A continuous connect concept is also brought about.

On the whole, the proposed gesture evaluation in a vehicle can be used in many ways. Further systems can also be incorporated in the gesture detection, such as for example information transmission of the evaluation to the Internet. To this end, the vehicle may establish an Internet connection itself or establish a radio link via a further communication link, for example to a service center of the car manufacturer, and then the data can be saved at the service center and, if appropriate, be passed on, for example on the basis of the selected user profile settings, to different facilities, such as the Internet, such as specific social media forums on the Internet, such as a homepage etc.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A motor vehicle, comprising:
    a chassis;
    at least one vehicle system;
    a presentation system configured to present information; and
    a gesture evaluation system, including:
        an optical system configured to detect a gesture;
        a processing unit coupled to the optical system and configured to analyze the detected gesture; and
        a utilization unit configured to store, in at least one of a memory of the utilization unit and a remote storage device, an evaluation of the presented information as ascertained from the detected gesture together with the presented information, and
    the gesture evaluation system is configured to:
        detect a time duration of the detected gesture,
        assign a weight to the evaluation according to the detected time duration such that the longer the detected time duration the higher the weight assigned to the evaluation, and
        to initiate an operation of at least one of the at least one vehicle system, after the evaluation is ascertained and based on the weight assigned to the evaluation according to the detected time duration of the detected gesture,
        wherein the evaluation and the presented information are retrievable from the at least one of the memory of the utilization unit and the remote storage device.

2. The motor vehicle as claimed in claim 1,
    further comprising a vehicle management system,
    wherein the utilization unit is part of the vehicle management system.

3. The motor vehicle as claimed in claim 2, wherein
the vehicle management system is connectable with a global system of interconnected computer networks, and
the presented information is transmitted to at least one web site via the global system of interconnected computer networks.

4. The motor vehicle as claimed in claim 2, wherein
the vehicle management system is connectable with a network of remote servers hosted on the global system of interconnected computer networks, and
the evaluated information is stored in at least one server among the network of remote servers.

5. The motor vehicle as claimed in claim 1, wherein the gesture is an upright thumb.

6. The motor vehicle as claimed in claim 5, wherein the upright thumb is a right-hand thumb of a person.

7. The motor vehicle as claimed in claim 1, wherein the presented information includes information selected from at least one of a song, a location, a service facility, an image, a graphic, status information, a physical variable, a measurement value, a sound, and a suggestion.

8. The motor vehicle as claimed in claim 1, wherein the presentation system includes operating console of the motor vehicle.

9. The motor vehicle as claimed in claim 1, wherein the presentation system includes at least one of a display and a projector.

10. The motor vehicle as claimed in claim 1, wherein the optical system includes at least one of an optical sensor and a time-of-flight camera.

11. The motor vehicle as claimed in claim 1, wherein the evaluation is stored together with the presented information in the memory of the utilization unit.

12. The motor vehicle as claimed in claim 11, wherein when the detected time duration of the detected gesture is greater than a predefined time duration, the operation of the at least one of the at least one vehicle system is initiated.

13. A method for evaluating information provided by a device installed in a vehicle, the method comprising:
presenting information by a presentation system installed in the vehicle;
detecting a gesture that relates to the presented information;
analyzing the gesture to obtain an evaluation with respect to the presented information;
detecting a time duration of the detected gesture;
storing the evaluation together with the presented information in at least one of a memory of the vehicle and a storage device remotely located from the vehicle;
assigning a weight to the evaluation according to the detected time duration such that the longer the detected time duration the higher the weight assigned to the evaluation; and
initiating an operation of at least one vehicle system of the vehicle, after the evaluation is ascertained and based on the weight assigned to the evaluation according to the detected time duration of the detected gesture,
wherein the evaluation and the presented information are retrievable from the at least one of the memory and the storage device.

14. The method as claimed in claim 13, further comprising transmitting the evaluation together with the presented information to the storage device remotely located from the vehicle via a radio link.

15. The method as claimed in claim 13, wherein the operation of the at least one vehicle system of the vehicle is initiated when the detected time duration of the gesture is greater than a predefined time duration.

* * * * *

UNITED STATES PATENT AND TRADEMARK OFFICE
CERTIFICATE OF CORRECTION

PATENT NO. : 9,874,939 B2
APPLICATION NO. : 15/125084
DATED : January 23, 2018
INVENTOR(S) : Michael Schlittenbauer et al.

Page 1 of 1

It is certified that error appears in the above-identified patent and that said Letters Patent is hereby corrected as shown below:

In the Claims

Column 7, Line 12:
In Claim 4, delete "evaluated" and insert -- presented --, therefore.

Column 7, Line 24:
In Claim 8, after "includes" insert -- an --.

Column 7, Line 35:
In Claim 12, delete "claim 11," and insert -- claim 1, --, therefore.

Signed and Sealed this
Third Day of April, 2018

Andrei Iancu
*Director of the United States Patent and Trademark Office*